United States Patent

[11] 3,590,212

| [72] | Inventors | Don J. Corrigall; William D. Oldershaw, both of Appleton, Wis. |
|---|---|---|
| [21] | Appl. No | 827,288 |
| [22] | Filed | May 23, 1969 |
| [45] | Patented | June 29, 1971 |
| [73] | Assignee | Miller Electric Manufacturing Company Appleton, Wis. |

[54] ANODIZED ALUMINUM WELDING TORCH
5 Claims, 2 Drawing Figs.

[52] U.S. Cl. ..................................................... 219/130, 219/137, 219/136
[51] Int. Cl. .............................................. B23k 9/00
[50] Field of Search ........................................ 219/136, 75, 74, 130, 137

[56] References Cited
UNITED STATES PATENTS

| 3,123,702 | 3/1964 | Keidel et al. | 219/130 X |
| 3,251,977 | 5/1966 | McGinty et al. | 219/75 |
| 3,239,120 | 3/1966 | Bosteels | 219/130 X |
| 3,444,353 | 5/1969 | Wilson | 219/136 |

Primary Examiner—J. V. Truhe
Assistant Examiner—George A. Montanye
Attorney—Sughrue, Rothwell, Mion, Zinn & Macpeak ABSTRACT: A gas arc welding torch in which the nozzle is made of anodized aluminum and the contact tube is clad with anodized aluminum to prevent the sticking of weld spatter to these parts.

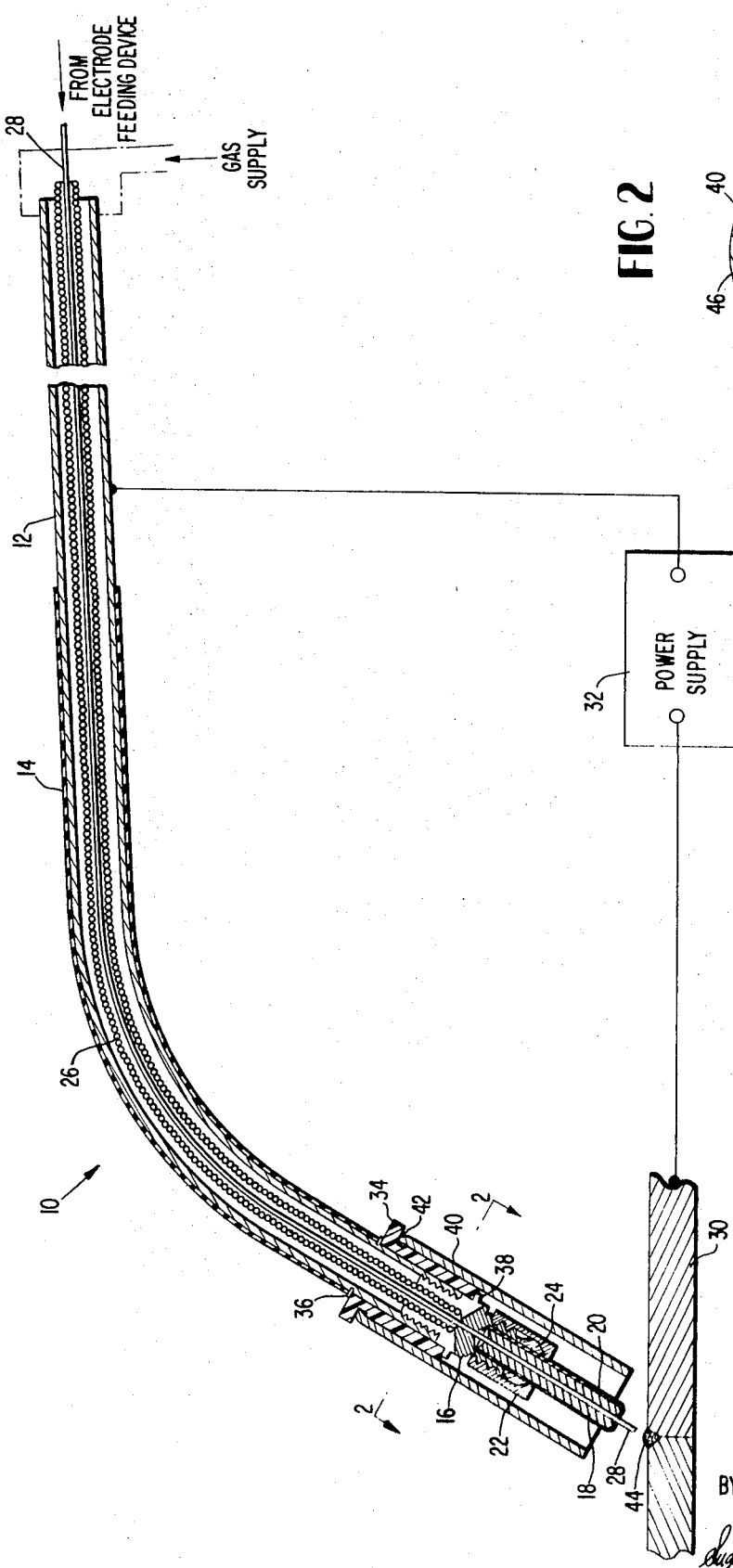
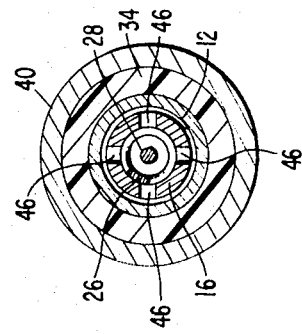

ANODIZED ALUMINUM WELDING TORCH

BACKGROUND OF THE INVENTION

1. Field of the Invention

The invention relates to the field of gas arc welding torches, and, more particularly to a construction and method for preventing weld spatter from sticking to the torch.

2. Description of the Prior Art

In a gas metal arc welding process where a continuous, consumable metal electrode is fed into the arc, a certain degree of weld spatter occurs. This splatter is droplets of hot molten metal which are ejected from the weld pool during arc welding. When the spatter impinges on the gas nozzle, contact tube and other parts of the welding torch which are in close proximity to the arc, the metal spatter sticks rather tenaciously to those parts. Eventually the metal builds up in the area between the contact tube and the nozzle and impedes the flow of shielding gas through the nozzle. Furthermore, the buildup of spatter may grow to such an extent that an electrically conducting bridge is formed between the electrode and the normally insulated torch gas nozzle thus short circuiting the welding arc potential if the nozzle is brought into contact with the workpiece which is a normal welding circumstance. Previous attempts at preventing this sticking of spatter have included the application of silicones and other chemicals to the part of the welding torch in the area of the arc, but the heat of the arc has been too great for any appreciable improvement in the reduction of sticking. In addition, the gas nozzles and contact tubes have been made of copper, red brass, etc. and in some cases plated with chromium in an effort to reduce the sticking of the welding spatter. However, such attempts have been only partially satisfactory, and after a short time of operation, the spatter begins to stick very tenaciously to the torch parts. Furthermore, the contact tube has been covered by a removable sleeve which is removed from the tube when a certain amount of spatter has built up on the sleeve.

SUMMARY OF THE INVENTION

The object of he invention is to provide a welding torch construction that reduces or prevents the sticking of welding spattered to the torch.

Briefly, the above object is accomplished by making certain parts of the welding torch of anodized aluminum so that the weld spatter will not stick thereto. More specifically, the gas nozzle is made from anodized aluminum, and the copper contact tube may be clad with anodized aluminum. The prevention of the sticking of spatter to the torch parts eliminates metal buildup between the contact tube and gas nozzle, thereby eliminating the possibilities of blocking or distorting the flow of shielding gas through the nozzle and of short circuiting the welding arc.

Therefore, the invention may be summarized as an improved arc welding torch having portions which are made of anodized aluminum and also the method of preventing the sticking of weld spatter to the torch by the use of anodized aluminum in certain parts of the torch.

BRIEF DESCRIPTION OF THE DRAWING

FIG. 1 is a cross-sectional diagrammatic view of an arc welding torch embodying the invention.

FIG. 2 is a cross-sectional view taken along line 2–2 in FIG. 1.

DESCRIPTION OF THE PREFERRED EMBODIMENT

In FIG. 1 there is illustrated a gas arc welding torch 10 having a copper tubular torch body 12 which is covered over a portion of its length with a layer 14 of suitable insulating material. The lower end of the torch body 12 is threaded to receive a liner mounting nut 16 which, according to the invention, is made of anodized aluminum. Mounted in a bore in the lower end of nut 16 is a copper contact tube 18 surrounded by an anodized aluminum cladding 20. Contact tube 18 is secured to the nut 16 by means of a threaded fitting 22 and a brass compression fitting or ferrule 24. According to the invention, fitting 22 is also made of anodized aluminum.

Fitted within a bore formed in the upper end of the nut 16 is a flexible coiled liner 26 through which a consumable welding electrode 28 is fed by a conventional feeding means (not shown). Electrode 28 extends from the lower end of the contact tube 18 and, during a welding operation, is spaced a short distance above the metal workpiece 30 so that an arc is formed between the workpiece and the electrode. AC or DC voltage for forming the arc is provided by a conventional power source 32.

Fitted around the lower end of the torch body 12 is a Teflon insulator cup 34 which is clamped between a retaining ring 36 and a shoulder 38 on the lower end of nut 16. Surrounding the contact tube 18 is a gas nozzle 40 which is secured to the torch by bending the top portion 42 of the nozzle into an annular slot formed in insulator 34. The contact tube 18 extends slightly beyond the end of the nozzle 40 which may rest upon the workpiece 30 during a welding operation.

According to this invention, the nozzle 40 is made of anodized aluminum, i.e. the inner and outer surfaces are anodized, so that the metal spatter formed from the molten weld pool 44 does not stick to the nozzle. Furthermore, the fitting 22 and nut 16 are made of aluminum also to prevent sticking of the metal spatter, whereas these parts are conventionally made of brass. Copper is the preferred metal for contact tube 18 for three reasons: (1) it is a much better conductor than aluminum; and (2) the electrode 28 is less likely to bind in passing through the long close-fitting hole of the contact tube when the tube is made of copper than when it is made of aluminum, and (3) the hardness, tenaciousness and the ever presence of aluminum oxide make it unsuitable for the necessary moving high-current electrical contact that must be made to the electrode wire by the contact tube. However, the antisticking feature can be achieved with regard to the contact tube by cladding it with anodized aluminum. This cladding is indicated by the reference number 20.

In the prior art, the removal of slag created quite a problem. It normally required a sharp blow with a heavy, hard object or the utilization of a scraping tool. After spatter h0s been removed a few times, the surface of the torch parts receiving the spatter become roughened, thereby making the spatter adhere more and more tenaciously. Under these circumstances a sharp blow will no longer suffice and only hard scraping will remove the buildup. By contrast, with the use of anodized aluminum in accordance with the invention, the spatter will often fall off unassisted, and in circumstances where it doesn't, it can be removed with a minimum amount of coaxing, such as by the application of a shop rag or a brush.

The anodized aluminum cladding 20 on contact tube 18 may be either clad with a piece of tubular anodized aluminum or else coated with aluminum which is anodized. If the first technique is used, the copper contact tube is cooled to shrink it, and then a hot anodized aluminum tube is placed over the contact tube. When the copper tube warms up and the anodized aluminum tube cools down, the aluminum tube will shrink tightly onto the copper contact tube, thereby cladding the contact tube. In the second technique, the copper contact tube is first coated with metallic aluminum and then anodized in an electrolytic bath.

The aluminum oxide coating formed by an anodizing process is extremely thin and has a very smooth surface as compared to an aluminum oxide layer which is formed by a mechanical coating process, such as a plasma coating process, for example. The anodized coating is extremely tenacious and will not chip off, i.e., it is mechanically stronger than that obtained by mechanical coating processes. Such an anodized coating is particularly important for use in an arc welding torch since the thin layer will better follow the expansion and contraction due to the thermal cycles normally encountered when arc welding than a thick layer will. Furthermore, much better control is obtained over an aluminum oxide surface provided by an anodizing process as compared to a mechanical coating process. Furthermore, the color of anodized aluminum radiates heat better than chromium plating or bare metal, thereby permitting the nozzle to operate at a lower temperature. Consequently, the insulator cup 34 holding the nozzle 40 in position has a longer life because it is subjected to lower temperatures.

Electrode 28 is fed through the liner 26, a bore in the nut 16 and through contact tube 18 to a point above the workpiece 30 where the weld is to be formed so that the potential developed between the electrode and the workpiece 30 strikes an arc. The electrode wire is fed by suitable conventional feeding means (not shown). Further, an inert shielding gas, such as $CO_2$, is applied to the upper end of the welding torch 10 from a conventional low-pressure gas supply (not shown). The gas flows between the liner 26 and the torch body 12, through the slots 46 formed in the threads of nut 16 (See FIG. 2) and through the torch nozzle 40 so that it flows over the area being welded on workpiece 30.

While the foregoing description and attached drawing describe and illustrate in detail a preferred embodiment of an apparatus and method for preventing the sticking of weld spatter to an arc welding torch, the scope of the invention includes obvious modifications thereof and is defined in the appended claims.

We claim:

1. In an improved gas arc welding torch including a metal contact tube through which an elongated consumable electrode is adapted to be fed toward a workpiece to be welded, the improvement comprising an anodized aluminum nozzle surrounding said tube and spaced apart from said tube to form a passageway for the flow of an inert gas towards the workpiece, whereby weld spatter will not stick to said nozzle.

2. The improved welding torch of claim 1 wherein said contact tube is copper and further comprising a layer of anodized aluminum on the outer surface of said contact tube for preventing weld spatter from sticking to said outer surface thereby preventing spatter buildup between said tube and said nozzle.

3. The method of preventing weld spatter from sticking to the surface of a tubular gas nozzle of a gas arc welding torch in which a welding contact tube is disposed within and spaced from the nozzle, comprising the steps of:
   a. Making said nozzle of aluminum, and
   b. Anodizing said surface of said nozzle so that weld spatter impinging upon said surface will not stick thereto.

4. The method of claim 3 wherein said contact tube is made of copper and further comprising the step of forming on the outer surface of said contact tube a layer of anodized aluminum so that welding spatter impinging upon said outer surface of said contact tube will not stick thereto.

5. The method of claim 4 wherein said forming step further comprises cladding the outer surface of said contact tube with anodized aluminum.